July 15, 1969  S. D. POOL ET AL  3,455,502
FRUIT PICKER
Filed Aug. 13, 1965  3 Sheets-Sheet 2
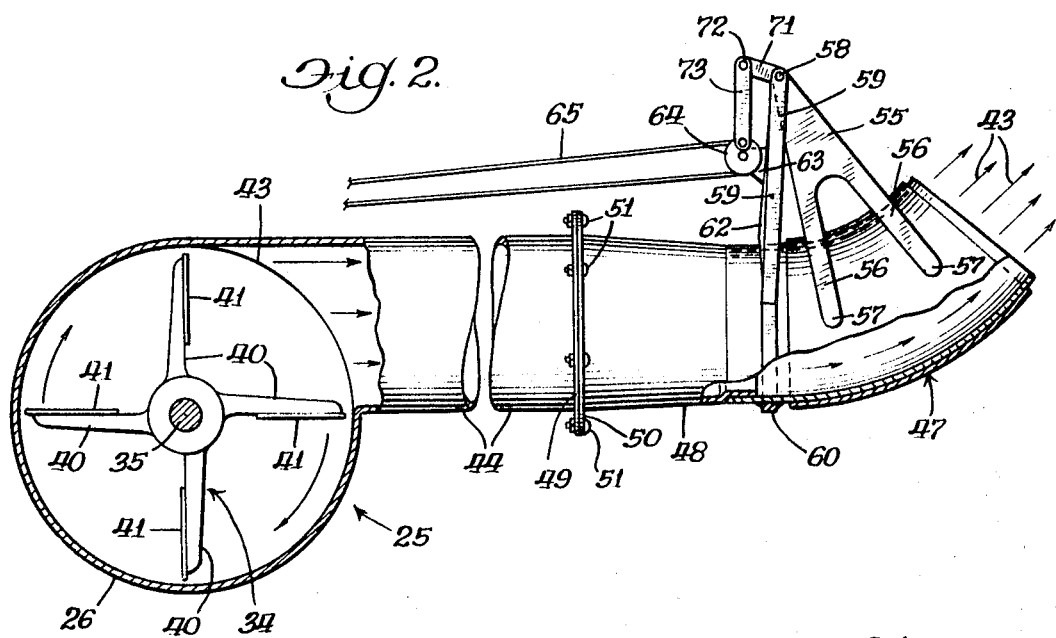
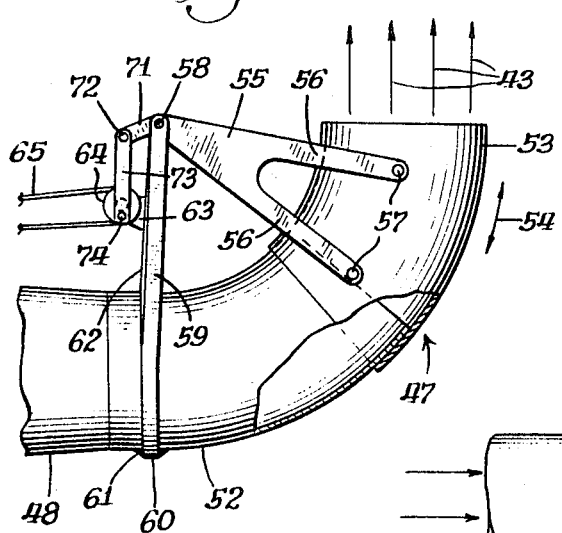
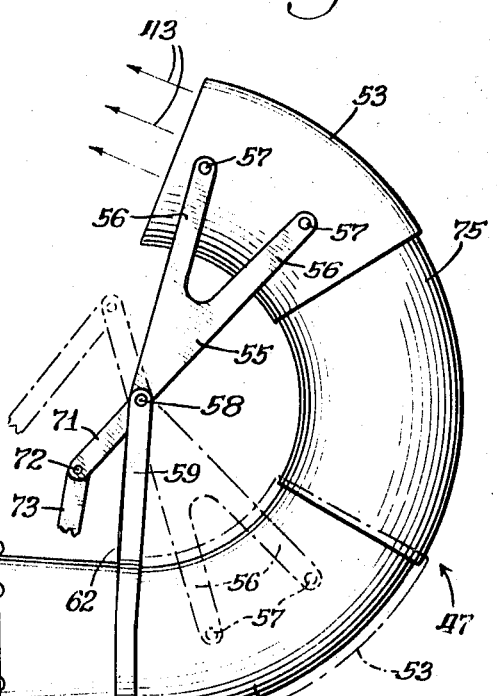
Inventors
Stuart D. Pool
John F. Reynolds
John J. Kowalik
Atty.

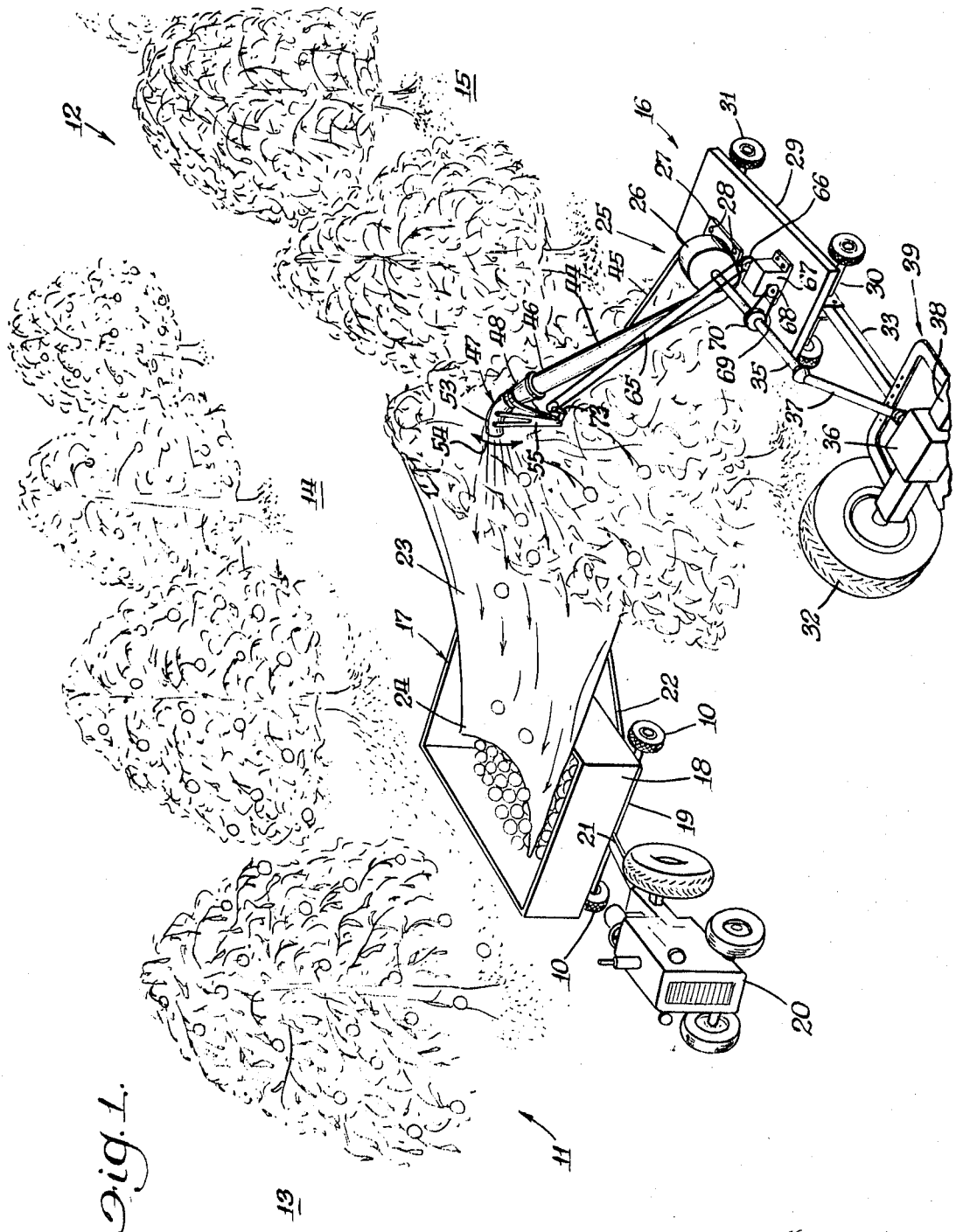

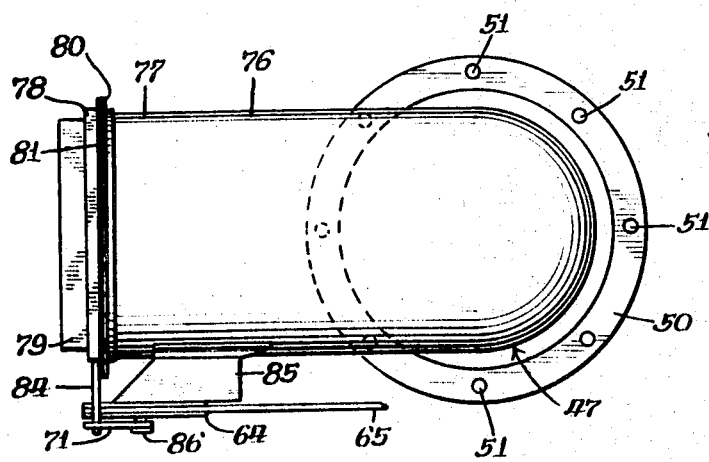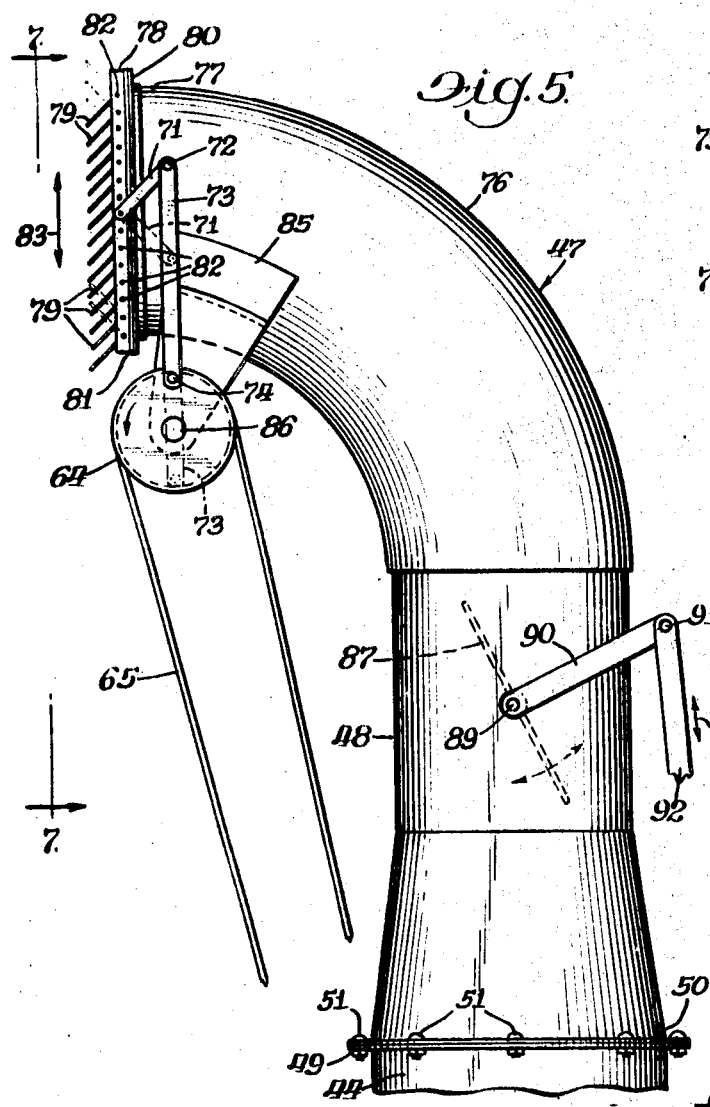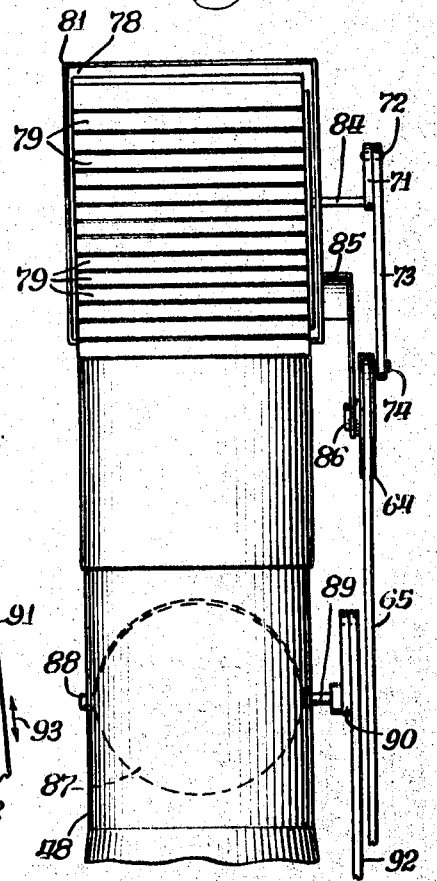

United States Patent Office 3,455,502
Patented July 15, 1969

3,455,502
FRUIT PICKER
Stuart D. Pool, Naperville, and John F. Reynolds, La Grange, Ill., assignors to International Harvester Company, Chicago, Ill., a corporation of Delaware
Filed Aug. 13, 1965, Ser. No. 479,495
Int. Cl. F04d 29/46, 27/00; A01g 19/08
U.S. Cl. 230—274                                                14 Claims

ABSTRACT OF THE DISCLOSURE

A mobile fruit harvester including a blower fan structure for conducting a stream of high velocity air through an elongated duct extending upwardly from the fan structure. A curved duct section is mounted on the duct for oscillatory movement to continuously change the direction of the issuing air stream toward crop-bearing trees to dislodge the crop therefrom.

---

The instant invention relates to fruit harvesting. Particularly the invention relates to a pneumatic device adapted for picking fruits and the like.

With a view to minimizing manual labor in connection with harvesting of fruit, such as oranges, lemons and the like, various mechanical fruit pickers have been developed for commercial fruit harvesting. Conventional mechanical devices comprises tree shakers which are adapted to be carried or driven between rows in orchards for stationing adjacent successive trees to be harvested. The shakers have power-reciprocated parts which are extendable into tree engagement from their carriers and thereby are adapted to shake fruit free from bearing limbs. While mechanical devices are effective for harvesting fruit and the like, their use is accompanied by inimical problems inherently characteristic of such devices which detract from the desirability of shakers for use in harvesting.

To effectively use a conventional manual fruit picker—that is, a tree shaker—to dislodge fruit from trees, each limb should be shaken separately by applying directly thereto shaking force. To rely on shaking force to dislodge fruit carried on one limb by applying force to adjacent limbs is not generally satisfactory, for the reason that, while the directly shaken limb may have adequate shaking force applied thereto, such force, if just sufficient to shake fruit free from the shaken limb, will not be adequate or of sufficient strength to shake the fruit from adjacent limbs. Increasing the force on a shaken limb to a level adequate to pick an adjacent limb will result in application of more than sufficient picking force to the directly shaken limb, as a consequence of which such directly shaken limb may be damaged.

The requirement, evident from the foregoing, that each limb to be harvested by convention means be individually shaken by a directly applied force involves two cost factors which it is desirable to minimize. Those are labor to engage each fruit-bearing limb with an extension of shaker apparatus, and obsolescence during inactivity of shaker equipment while the extensions are being applied to fruit bearing limbs.

Moreover, employment of conventional shakers for harvesting has attendant hazards to thereby harvested trees. One is the risk of limb breakage from shaking force. Another is the likelihood of bruising from frictional forces resulting from limb engagement by reciprocative shaker means.

In accordance with the instant invention, and as an object thereof, there is provided improved non-manual means for picking fruit and the like.

It is another object of the instant invention to provide a pneumatic fruit picker and the like.

A further object of the instant invention is the provision of a pneumatic fruit picker and the like having tree-shaking means.

An additional object of the instant invention is the provision in a pneumatic fruit picker of means for blasting a tree with an oscillating air stream.

A yet further object of the instant invention is the provision, in a pneumatic fruit picker and the like having means for blasting a tree with an oscillating air stream, of means for directing a controlled volume of the oscillating air stream to selected positions on the tree being harvested.

The foregoing and other objects, features and advantages of the present invention will become more apparent upon consideration of the following description and appended claims, when considered in conjunction with the accompanying drawings wherein the same reference character or numeral refers to like or corresponding parts thoughout the several views.

On the drawings:

FIG. 1 is a perspective view of an orchard and showing a mobile carrier supporting one embodiment of the instant invention in harvesting position.

FIG. 2 is a side elevational view of said embodiment, parts being broken away for the purpose of illustration.

FIG. 3 is an enlarged side elevational view of the oscillating nozzle of the embodiment of FIG. 2, however, in an alternate position therefrom, parts being broken away for the purpose of illustration.

FIG. 4 is an enlarged side elevational view of the oscillating nozzle of a modified form of the embodiment shown in FIG. 2, parts being shown dotted for the purpose of illustration.

FIG. 5 is an enlarged side elevational view of another embodiment of said invention.

FIG. 6 is a top plan view of the embodiment shown in FIG. 5.

FIG. 7 is an elevational view of the embodiment shown in FIG. 5 taken substantially on the line 7—7 of FIG. 5 and looking in the direction of the arrows.

Referring now more particularly to FIG. 1, there is seen an orchard comprising a plurality of trees arranged in parallel rows 11 and 12, defining therebetween parallel aisles 13, 14 and 15, a pair of such aisles being disposed on opposite sides of each of the tree rows 11 and 12. For purposes of economy, the rows 11 and 12 may be planted in such a manner that the widths of the aisles 13, 14 and 15 are adequate only to accommodate movement of harvesting vehicles in one direction but not permit turning about. In accordance with customary practice, a fruit picker generally designated as 16 may be advanced along one aisle, herein shown as 15, while the fruit harvested by the picker may be collected in a collection contrivance generally designated as 17 and disposed in an adjacent aisle, herein being 14.

The collection contrivance 17 selected for illustration, and which is intended as being in no way limiting on the invention, comprises a receptacle 18 which is carried on a mobile trail or frame 19 which is portable by reason of support on a plurality of wheels 10. The receptacle 18 is adapted to be moved adjacent successive trees by a conventional tractor 20 which is operably connected to said contrivance frame 19 by means of a suitable link 21. The receptacle 18 may have mounted in associated therewith a collection apron 23 which is extensibly carried on an arm means 22. Arm means 22 is mounted on said frame 19 for outward projection from said receptacle 18 to retractably position the apron 23 in fruit-catching position relative to a tree being harvested. In such fruit catching position, one end portion 24 of the apron 23 may be disposed within the upper or receiving opening of the receptacle 18, while the opposite end portion of said apron 23 is extended adjacent a tree being harvested in fruit-catching position to catch the fruit shaken therefrom by the fruit picker 16 which, in FIG. 1, is shown as being disposed on a side of the trees in row 12 opposite to that on which the collection contrivance 17 is disposed.

As illustrated in FIG. 1, the picker 16 of the instant invention comprises a hurricane blower fan generally designated by the number 25 and which is capable of producing air currents of high velocity of, for example, 125 miles per hour. The blower fan 25 shown has a housing 26 with a mounting flange 27 by means of which said blower fan can be anchored by fasteners 28 on a mobile carrier 29. The carrier 29 may be nothing more than a mounting platform or flat trail supported on a frame 30 which is rendered portable by means of wheels 31 and connected by a suitable yoke link 33 in tandem with a self-powered vehicle, such as a tractor 39 or the like, only a rear traction wheel 32 of which is shown in FIG. 1.

As illustrated in FIG. 2, the blower fan 25 comprises an impeller 34 which is secured on a driven shaft 35. By means of a suitable shaft linkage 37, the driven shaft 35 is connected to a transmission housing 36 which, as illustrated in FIG. 1, is borne by the rear framework 38 of the tractor 39 by which the carrier 29 is drawn during harvesting. Neither the specific means illustrated for rotation of the impeller 34 nor the details of construction of the carrier on which blower fan 25 is mounted is critical to the invention.

As illustrated in FIGS. 1 and 2, the blower housing 26 which is of substantially cylindrical configuration houses the impeller 34 which comprises a plurality of radial arms 40, on the outer end portion of each of which there is secured a flat impeller paddle 41, as illustrated in FIG. 2. The radial arms 40 extend outwardly from an impeller hub section 42 which is rigidly secured on an inner end portion of the driven shaft 35. In accordance with the instant invention, a blowing force or wind is generated or created which, assuming clockwise impeller rotation relative to FIG. 2, is in the direction indicated by arrows 43, only some of which have been numbered in FIGS. 2, 3 and 4. The wind generated by the hurricane fan 25 is of high velocity, which may range up to 125 miles per hour. Winds of such velocity may be sufficiently strong to cause bending of trees and stripping therefrom their fruits, together with leaves and the blossoms of ensuing crops which may be present. The manner in which the wind is effectively controlled will become apparent presently.

An elongated substantially straight neck or duct section 44 which is integral with housing 26 extends angularly upwardly and outwardly therefrom and the carrier 29 in a vertical plane, as illustrated in FIG. 1. The height of the carrier 29 is preferably such that the housing 26 is disposed at a level which is below that of the fruit-bearing foliage on trees to be harvested. To support the outwardly extending duct section 44, a brace 45 may have its outer end portion suitably connected to a medial part of said duct 44 and its inner end portion suitably secured to the carrier 29, or another relatively fixed part, as illustrated in FIG. 1.

The length of the duct 44 is such that its outer or upper end portion 46 is disposed at a level which will cause fan-generated wind currents to strip fruit from the tops of trees being harvested.

To the end that the trees will be effectively pneumatically harvested, means are provided for causing oscillations of the fan-generated air currents over the surface of the trees. Such means comprises a curved or arcuate nozzle, generally designated 47, which is friction mounted on the outer tapered end portion of a transition tube section 48 which is coextensive with the elongated duct 44.

The duct 44 may be circular in cross section, and is provided with an outer mounting flange 49 to which a corresponding flange 50 of the wide or inner end of the transition tube section is secured by fasteners such as bolt and nut combinations 51, only some of which have been numbered in FIG. 2.

In the embodiment of the invention illustrated in FIGS. 2, 3 and 4, the arcuate blower nozzle 47 comprises a curved inner or mounting section 52, the inner end portion of which is friction mounted on the tapered end portion of the transition section 48. The mounting may be of a character which will permit rotation of the section 52 on the end of the transition section about the longitudinal axis of the duct 44. While means for rotating such section 52 are not shown in the drawings, any suitable expedient will serve.

In the modification of the invention shown in FIGS. 2 and 3, a short telescopic nozzle section 53, the inside diameter of which is substantially the same as the outside diameter of the nozzle section 52 and which has a radius of curvature substantially the same as that of the curved nozzle section 52, is slidably mounted for inward and outward movement on said section 52. The telescopic nozzle section 53 is rockable or reciprocative in a vertical plane in the directions of the double-headed arrow 54 illustrated in FIG. 1, whereby fan-generated blast currents will be directed by said nozzle in a vertical plane over a limited portion of the tree, depending upon the position of the blower end telescopic section 53.

In the specific modification shown in FIGS. 2 and 3, the arcuate nozzle section 52 comprises a segment of approximately 45° of a circle defined by the radius of curvature of said nozzle section 52. The telescopic section 53 also comprises an arc of about 45° of the circle on said radius. Thereby, upon complete extension of the telescopic section 53, fan-generated currents will be directed at an angle of about 90° from the longitudinal axis of the elongated blower duct 44. Furthermore, upon reciprocation of said telescopic section 53, such currents will be correspondingly oscillated or directed over about a 45° segment within the plane of the blower duct 44, inwardly from and outwardly to the position of maximum nozzle extension.

As illustrated in FIGS. 2 and 3, means for reciprocating the telescopic nozzle section 53 are shown as comprising a driven bracket 55 having a plurality of rigid fingers 56 which are connected in driving engagement with the telescopic section 53 by means of suitable fasteners 57. The central end portion of the bracket 55 is pivotally connected to a pivot pin 58. The pivot pin 58 defines the center of curvature of nozzle section 53 and is rockably mounted in the central end portion of a rigid support which includes a pair of arms 59 and 62, as illustrated in FIGS. 2 and 3. The arms 59 and 62 are rigidly secured to a mounting band 60 which girds the section 52 to which said band is secured by welding, as at 61.

As illustrated, the arms 59 and 62 may extend toward each other from band 60. Moreover, arm 62 carries a bracket 63 on the end of which a sheave 64, which is driven by a pulley belt 65, is journalled. The pulley belt 65 is operated by a drive wheel 66 which is secured on the output shaft of a gear box 67, as illustrated in FIG. 1. The input shaft to the gear box 67 is driven because of a thereon-mounted sprocket wheel 68 which is operably connected by means of a sprocket chain 69 to a power takeoff sprocket 70 which is rigidly secured on the shaft 35 heretofore defined.

The ratio of the gears in the box 67 will determine the rate of rotation of the sheave 64 and, consequentially, the rate of reciprocation of the telescopic nozzle section 53. Accordingly, it is appreciated that by selectively adjusting the gear ratio in the gear box 67 the oscillatory rate of the telescopic nozzle section 53 can be varied.

The rotation of the sheave 64 is translated into reciprocation of the telescopic nozzle section 53 by crank means which comprise a crank arm 71, one end of which is operably connected to the pivot arm 58 and the opposite end of which is pivotally connected as at 72 to one end of a crank link 73. The opposite end of the crank link 73 is pivoted as at 74 to the sheave 64 eccentrically thereof, and thereby, as said sheave rotates, it oscillates the telescopic section 53 between the positions shown in FIGS. 2 and 3. As the nozzle section 53 is thusly reciprocated, the fan-generated blast currents will be directed outwardly from the blower in the plane of the duct 44 over an angle of approximately 45° about the center defined by the pivot pin 58.

Should it be desired to extend the range in a vertical plane over which the nozzle 47 can direct the wind, an additional curved telescopic nozzle section 75 may be employed in the arcuate nozzle 47, as illustrated in FIG. 4 which discloses a modification of the embodiment shown in FIGS. 2 and 3. The telescopic section 75 will have a radius of curvature which is the same as those of the nozzle sections 52 and 53. If, as in FIG. 4, the arcuate nozzle section 75 is of substantially the same length as is the section 53, the vertical coverage of the blower will be increased by approximately an additional 45° about the center defined by the pivot pin 58.

To permit effective use of nozzles 47 of varying lengths, accommodating variations or modifications in the lengths of the crank arm 71 and crank link 73 and the diameter and disposition of the sheave 64 may be required to the end that the crank arm 71 will be capable of rocking through an angle adequate to reciprocate the bracket 55 over desired angles. The character of such variations or modifications, if required, to accommodate oscillating nozzles 47 of different oscillatory ranges will be apparent to those in the art.

Attention now is invited to the embodiment of the invention which is illustrated in FIGS. 5, 6 and 7. There, the curved nozzle 47 comprises an arcuate tubular or duct section 76 which is substantially uniformly curved and extends about 90° around its center of curvature. The inner end portions of the arcuate section 76 is mounted in a friction fit over the outer end portion of the transition tube section 48; and, if desired, means (not shown) may be provided for rotation of the section 76 on the end of the transition section 48 about the longitudinal axis of the duct 44.

On its outer end portion 77, the nozzle section 76 carries a mounting flange 80 to which there is rigidly secured the mating flange 81 of a rectangular framework 78, which in the illustration is shown as disposed in a vertical plane. The rectangular framework 78 has mounted therein and supports in overlapping relationship a plurality of parallel rockable louvers 79 which are disposed across the end orifice of the arcuate nozzle 47. While the louvers 79 may extend vertically or horizontally, in the embodiment illustrated in FIGS. 5, 6 and 7, said louvers 79 are horizontaly disposed. They are pivoted about a plurality of parallel horizontal axes provided by a plurality of pairs of pins 82 which are carried in opposite end portions of the louvers 79, respectively, and journalled in the framework 78, as illustrated in FIG. 5, in which only some of such pins 82 have been numbered.

The louvers 79 are mounted for rocking or oscillation about their axes in a range of approximately 90°, with reciprocation thereof being in the directions indicated by the double-headed arrow 83 and between the dotted and solid line positions illustrated in FIG. 5. To the end that the louvers 79 are reciprocated in unison, they are linked to each other by any suitable means (not shown), whereby upon rocking of one of said pins 82, all of said pins and their associated louvers 79 will be rocked correspondingly. In the instant embodiment, a rock shaft 84 comprises an extension of or is rigidly secured to a medial of the pins 82 for transmission to the louvers of a reciprocative force. To the end that the rock shaft 84 is operated, the sheave 64 is rotatably supported on a pin or shaft 86 which is carried in the outer end portion of a bracket 85, said bracket being rigidly secured to and extending outwardly from the nozzle section 76, as illustrated in FIGS. 5, 6 and 7. The sheave 64, as previously described in connection with the embodiment illustrated in FIGS. 2, 3 and 4, is adapted to drive the crank arm 71 through the link 73. In the instant embodiment of the invention, the link 73 serves to reciprocate the rock shaft 84 to the outer end of which the outer end of the crank arm 71 is operatively connected.

Should it be desired to vary the volume of air, and, accordingly, the force of the fan-generated currents, a volume control mechanism such as that illustrated in FIGS. 5 and 7 may be provided. The volume control mechanism comprises a butterfly type valve 87 shown in dotted line in FIGS. 5 and 7. It is ovate, being almost circular on a radius substantially equivalent to the transition tube section 48 in which said valve 87 is mounted. Thereby, if desired, the opening within the tube section 48 can be almost, though not entirely, blocked, to the end that, if desired, fan-generated currents can be almost entirely blocked. To effectuate its mounting, the valve 87 has a pair of diametric extensions 88 or journalling lugs which define an axis of rotation extending transversely of the longitudinal axis of the duct 44 and rockably mounted in the walls of the tube section 48. One of said extensions 88 has an outward projection 89 for operable connection to one end portion of a link 90, the hub of which is rigidly secured to said projection. The other end of link 90 is pivotally connected, as at 91, to control rod 92. The control rod 92 may be mounted in any suitable manner for manual operation in the directions of the double-headed arrow 93, as illustrated in FIG. 5, whereby the valve 87 is correspondingly rocked.

The invention is adapted to be utilized by moving the carrier 29 in an orchard down an aisle, for example aisle 15, parallel to a row of trees 12 which are to be harvested, with the blower duct 44 extended angularly upwardly from the carrier 29 toward the trees and disposed in a substantially vertical plane. Thereby the outlet opening of nozzle 47 may be directed toward a tree. By providing means (not shown) for oscillating the nozzle 47 about the longitudinal axis of the duct 44, air blasts from fan 25 may be directed toward a tree in advance of being reached by the carrier 29. Accordingly, fan-generated wind of hurricane velocity could be brought to bear gradually on the trees in a row to tend to cause each tree to sway in an increasing arc extending longitudinally of the carrier path.

Simultaneously, the fan-generated currents will be oscillated in a plane extending lonigtudinally of the duct 44 by reason of reciprocation of sections of nozzle 47, in the event of employment of the embodiment illustrated in FIGS. 2, 3 and 4, or by reason of the oscillation of the louvers 79, in the event of employment of the embodiment illustrated in FIGS. 5, 6 and 7. Such oscillation will cause the currents to be applied to the trees longitudinally thereof, whereby an affected tree will tend to sway in an ever-increasing arc in the plane of the duct 44. The application of wind in the manner indicated results in multi-directional forces causing rotational fruit shaking motion to be developed by reason of which fruits will be blown or jolted loose from their connections.

While the use of the collection contrivance 17 indicates that the carrier 29 will be intermittently stopped because the collection contrivance should be stopped at each tree for best fruit-catching results, other conventional means for continuous collection of fruit harvested from trees may be employed to the end that the carrier 29 may be continuously moved through an orchard.

Upon employment of the instant invention, it may be desirable to control the velocity of the wind generated by the fan 25 to obviate damage to blossoms of the next crop which may be found present on plants being harvested. Accordingly, controlled velocity is possible through operation of the butterfly valve 87, as well as through oscillation control. Knowledge of the manner in which to best manage the hurricane velocity will be gained by an operator through experience. In connection with the instant invention, a high degree of proficiency can be developed through experience which will provide maximum yields at maximum harvesting efficiency.

As many changes or substitutions could be made in the above described construction, and as many apparently widely different embodiments of the invention within the scope of the claims could be constructed without departing from the scope and spirit thereof, it is intended that all matter contained in the accompanying specification shall be interpreted as being illustrative and not in a limiting sense.

What is claimed is:

1. A fruit picker and the like comprising a mobile frame adapted for forward movement in an aisle between a pair of rows of crop-bearing trees in an orchard; an elongated air duct carried on said frame and having an end portion disposed upwardly and outwardly from one side of said frame; means communicatively connected with said duct and adapted to provide a high velocity air stream of tree shaking force adequate to remove thereby-borne crop, and means for oscillating said air duct end portion to direct an oscillating stream of air toward a row of crop-bearing trees.

2. A fruit picker and the like comprising a mobile frame arranged for forward movement in an aisle between a row of crop-bearing trees in an orchard; a fan housing supported on said frame; a blower fan structure adapted for production of a high velocity air stream of tree shaking force adequate to remove thereby-borne crop and mounted in said housing; an elongated duct having an axially aligned lower end portion connected to said fan housing and an outer end portion projecting upwardly and outwardly from a side of said frame and angularly from said lower end portion; an oscillatable mechanism mounted on the outer end portion of said duct and adapted to direct a stream of air from said blower fan structure in an oscillatory path toward a row of trees, and means for oscillating said oscillatable mechanism.

3. The device defined in claim 2 in which the oscillatable mechanism comprises a telescopically connected duct means co-extensive with said elongated duct and having an outer blower opening, said telescopically connected duct means mounted on said outer end portion, said blower opening adapted for direction treeward during harvesting.

4. The device defined in claim 3 in which the telescopically connected duct means is telescopically extensible about its center of curvature and rockable about the longitudinal axis of said lower end portion whereby a blower-fan-generated air stream may be oscillated vertically and horizontally.

5. The device defined in claim 3 in which the telescopically connected duct means is retractibly extensible about its center of curvature whereby the discharge opening may be oscillated vertically to correspondingly direct a blower-fan-generated air stream.

6. The device defined in claim 2 in which the oscillatable mechanism comprises a plurality of parallel louvers rockably mounted on the outer end portion of said duct in the path of a blower-fan-generated air stream.

7. The device defined in claim 6 in which the louvers are disposed vertically.

8. The device defined in claim 6 in which the louvers are disposed horizontally.

9. The device defined in claim 2 in which the means for oscillating the oscillatable mechanism is a continuously drivable crank mechanism arranged for operable connection to said oscillatable mechanism.

10. A fruit picker and the like comprising a mobile frame arranged for forward movement in an aisle between a row of crop-bearing trees in an orchard; a fan housing supported on said frame; a blower fan structure adapted for production of a high velocity air stream of tree shaking force adequate to remove thereby-borne crop and mounted in said housing; an elongated duct having an aligned lower end portion connected to said fan housing and an outer end portion projecting upwardly and outwardly from a side of said frame and angularly from said lower end portion; an oscillatable mechanism mounted on the outer end portion of said duct and adapted to direct a stream of air from said blower fan structure in an oscillatory path toward a row of trees, and means for oscillating said oscillatable mechanism, the means for oscillating the oscillatable mechanism including a continuously drivable crank mechanism arranged for operable connection to said oscillatable mechanism, said crank mechanism comprising a rotatably drivable member; a link connected eccentrically to said drivable member; a rockable shaft disposed adjacent said link; a crank arm connected to said link and said rockable shaft to rock said shaft as said link is carried about said drivable member, and a rocker member having one end portion connected to said rockable shaft and the other end portion connected to said oscillatable mechanism.

11. A fruit picker and the like comprising a mobile frame arranged for forward movement in an aisle between a row of crop-bearing trees in an orchard; a fan housing supported on said frame; a blower fan structure adapted for production of a high velocity air stream of tree shaking force adequate to remove thereby-borne crop and mounted in said housing; an elongated duct having an axially aligned lower end portion connected to said fan housing and an outer end portion projecting upwardly and outwardly from a side of said frame and angularly from said lower end portion; an oscillatable mechanism mounted on the outer end portion of said duct and adapted to direct a stream of air from said blower fan structure in an oscillatory path toward a row of trees, and means for oscillating said oscillatable mechanism, said oscillatable mechanism including a telescopically connected duct means coextensive with said elongated duct and having an outer blower opening, said telescopically connected duct means mounted on said outer end portion, said blower opening adapted for direction treeward during harvesting, said means for oscillating the oscillatable mechanism comprises a rock shaft mounted at the center of curvature of said telescopically connected duct means; a rocker member having one end connected to said rock shaft and the other to said telescopically connected duct means and continuously drivable shaft rocker means for rocking said shaft to telescopically oscillate an air stream blown through said duct.

12. A fruit picker and the like comprising a mobile frame arranged for forward movement in an aisle between a row of crop-bearing trees in an orchard; a fan housing supported on said frame; a blower fan structure adapted for production of a high velocity air stream of tree shaking force adequate to remove thereby-borne crop and mounted in said housing; an elongated duct having an axially aligned lower end portion connected to said fan housing and an outer end portion projecting upwardly and outwardly from a side of said frame and angularly from said lower end portion; an oscillatable mechanism mounted on the outer end portion of said duct and adapted to direct a stream of air from said blower fan structure in an oscillatory path toward a row of trees, and means for oscillating said oscillatable mechanism, said oscillatable mechanism including a plurality of parallel louvers rockably mounted on the outer end portion of said duct in the path of a blower-fan-generated air stream, said means for oscillating the oscillatable mechanism comprises a rockable rock shaft having one end portion operably connected to said louvers for rocking the same; a crank arm having one end portion pivotally connected to said rock shaft for rocking thereof; drivable eccentric means, said crank arm operably connected to said eccentric means, and means for driving said drivable eccentric means to rock said louvers.

13. A fruit picker comprising a mobile frame arranged for forward movement in an aisle between rows of trees to be harvested; mover means operably supported on said frame; a blower fan housing supported on said frame; a high velocity impeller mounted in said fan housing and driven by said mover means; an elongated duct disposed in a substantially vertical plane extending upwardly and sidewardly from said frame, said duct having an axially aligned lower end portion communicatively connected to said housing and an upper end portion extending outwardly angularly from the axis of said lower end portion, said upper end portion having an upper opening to pass a stream of air from said blower fan housing; a plurality of linked-together rockable louvers mounted in said upper opening and disposed transversely thereof; a drivable wheel operably connected to said mover; a link having one end portion connected to said wheel and reciprocated thereby to translate wheel torque into linear force; an arm having one end portion pivotally connected to said link distal from said wheel and rockable thereby; a rock rod operably connected to said rockable louvers, said arm having an opposite end portion connected to said rock rod to rock the same to rock the louvers and oscillate an air stream carried through said duct from said fan housing.

14. A fruit picker comprising a mobile frame arranged for forward movement in an aisle between rows of trees to be harvested; mover means operably suported on said frame; a blower fan housing supported on said frame; a high velocity impeller mounted in said fan housing and driven by said mover means; an elongated duct disposed in a substantially vertical plane extending upwardly and sidewardly from said frame, said duct having an axially aligned lower end portion communicatively connected to said housing and an upper end portion extending outwardly angularly from the axis of said lower end portion; curved duct means co-extensive with said duct and defining an upper end opening adapted to pass a stream of air from said blower fan housing, said curved duct means telescopically arranged on the upper end portion of said duct; a drivable wheel operably connected to said mover; a link having one end portion connected to said wheel and reciprocated thereby to translate wheel torque into linear force; an arm having one end portion pivotally connected to said link distal from said wheel and rockable thereby; a rock shaft disposed on the axis of curvature of said duct means, said arm having an opposite end portion connected to said rock shaft; a hanger supported by said duct, said rock shaft journalled in said hanger; a member having one end portion connected to said rock shaft for rocking said member with said shaft and an opposite end portion secured to said duct means to alternately extend and withdraw the upper end opening to oscillate a stream of air generated by said impeller in an arc.

References Cited

UNITED STATES PATENTS

| | | | |
|---|---|---|---|
| 680,280 | 8/1901 | Roesser | 230—274 |
| 736,599 | 8/1903 | Hood | 302—9 |
| 840,603 | 1/1907 | Bodvig | 302—9 |
| 856,609 | 6/1907 | Sellers | 302—9 |
| 1,330,547 | 2/1920 | Mehlhaf. | |
| 1,956,829 | 5/1934 | Frank | 230—274 |
| 2,190,118 | 2/1940 | Hardin | 230—274 |
| 2,279,425 | 4/1942 | Voysey | 230—274 |
| 2,833,409 | 5/1958 | Sisulak | 302—61 |
| 3,310,231 | 3/1967 | Wininger | 230—114 |

HENRY F. RADUAZO, Primary Examiner

U.S. Cl. X.R.

56—328; 230—114